United States Patent [19]

Ibaraki

[11] 4,241,851

[45] Dec. 30, 1980

[54] ADJUSTABLE OIL FUNNEL

[75] Inventor: Howard Ibaraki, Monterey Park, Calif.

[73] Assignee: Orion Industries, Inc., Compton, Calif.

[21] Appl. No.: 39,395

[22] Filed: May 15, 1979

[51] Int. Cl.³ .............................................. B67B 7/28
[52] U.S. Cl. ................................. 222/83.5; 222/165; 141/330
[58] Field of Search ................. 222/83.5, 88, 86, 165; 141/330

[56] References Cited

U.S. PATENT DOCUMENTS

| 1,028,542 | 6/1912 | Christian | 141/330 |
| 2,040,584 | 5/1936 | Wiswell | 141/330 |
| 2,179,390 | 11/1939 | Urton | 222/83.5 |
| 2,184,830 | 12/1939 | Boissean | 222/88 |
| 2,603,385 | 7/1952 | Toth | 222/88 X |
| 2,755,001 | 7/1956 | Doepke et al. | 222/165 |

*Primary Examiner*—Robert J. Spar
*Assistant Examiner*—Frederick R. Handren
*Attorney, Agent, or Firm*—Fulwider, Patton, Rieber, Lee & Utecht

[57] ABSTRACT

An oil dispensing device is provided with a funnel and with a cradle located at the funnel mouth for releasable, rotatable interengagement therewith. The cradle has a chute with an upwardly directed piercing blade at its lower extremity and a trigger mechanism for forcing an oil can down onto the piercing blade at its upper extremity. Rotation limiting stops on the cradle and funnel prevent the chute from being rotated upward beyond the edge of the mouth of the funnel.

4 Claims, 4 Drawing Figures

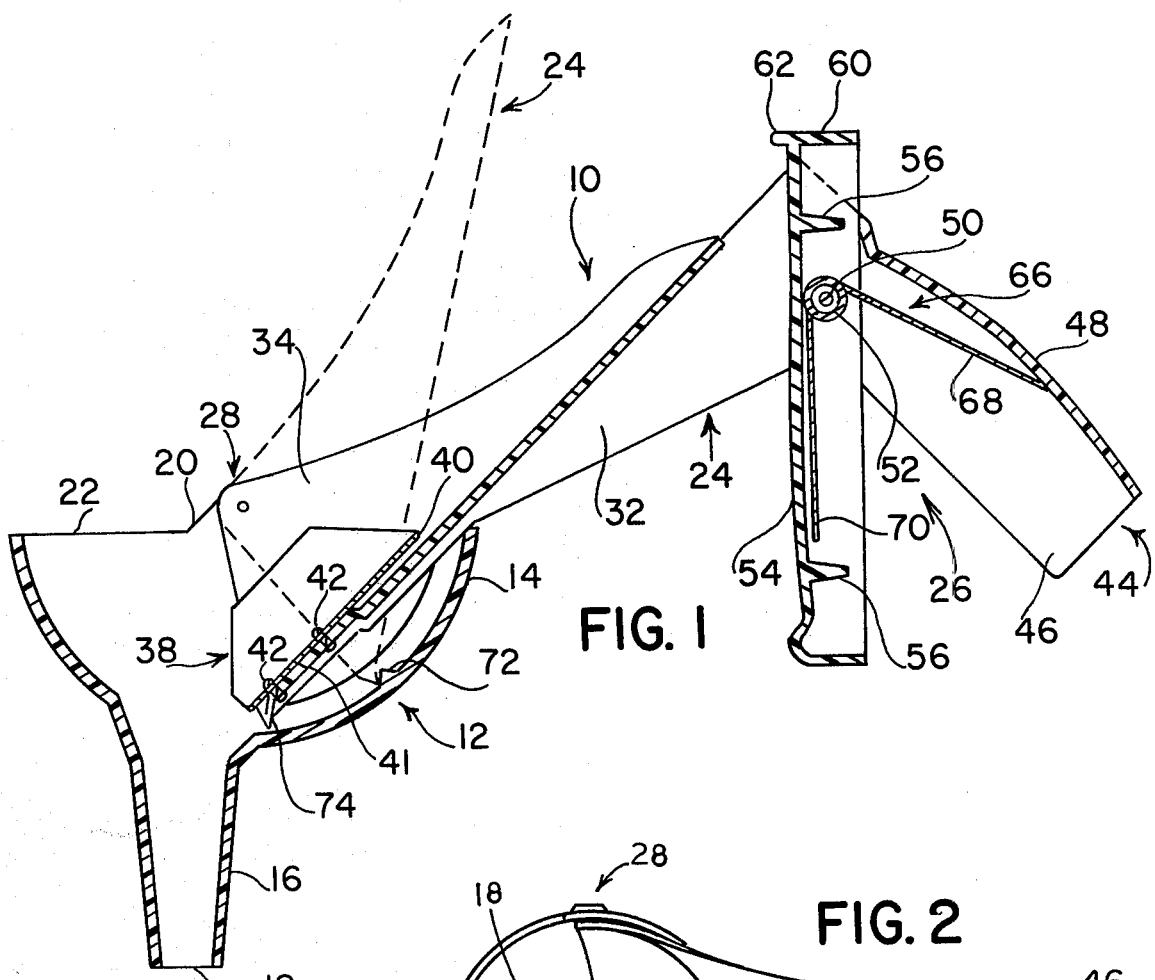
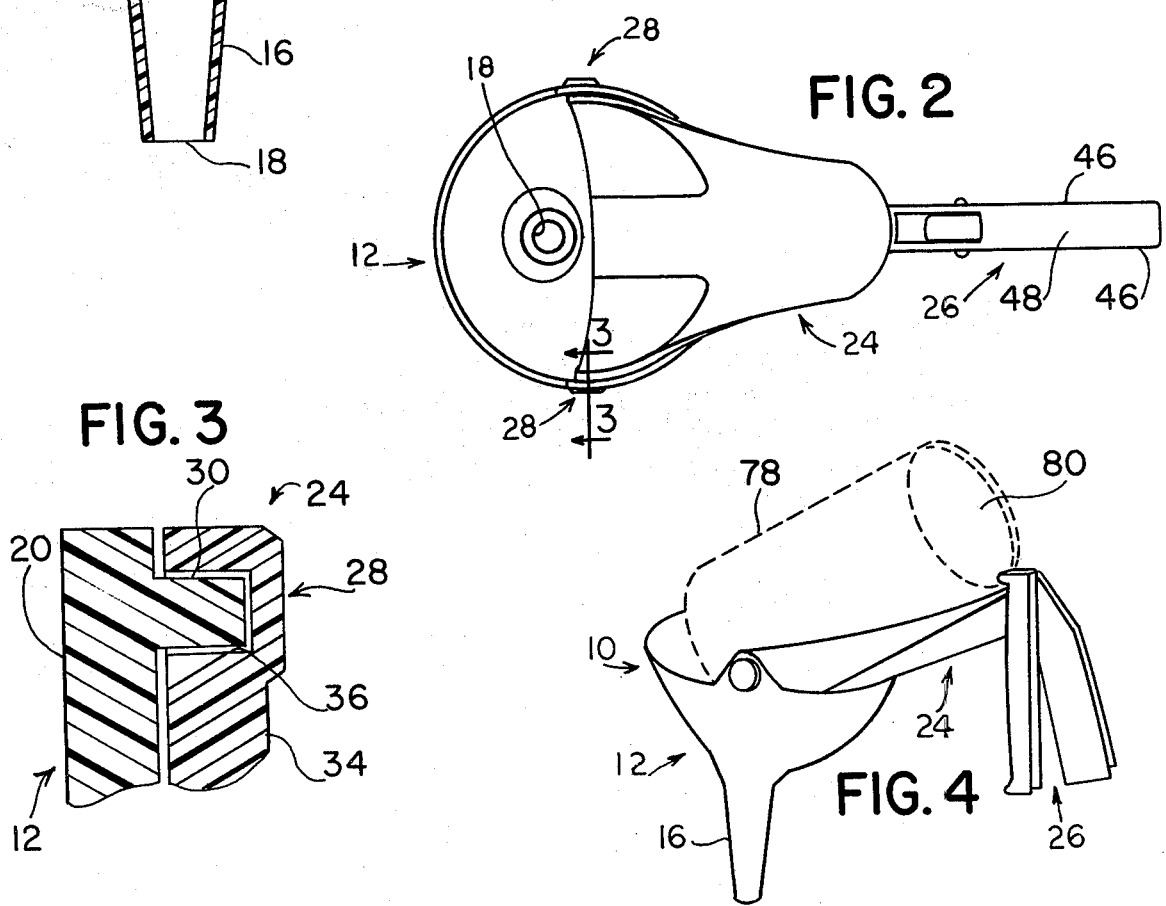

ADJUSTABLE OIL FUNNEL

BACKGROUND OF THE INVENTION

1. Field of the Invention

The present invention relates to oil dispensing devices for use in supplying motor oil to automotive vehicles.

2. Description of the Prior Art

In the past, various devices have been manufactured to aid in the provision of motor oil for automotive vehicles having internal combustion engines. Typically, motor oil is supplied to the engine block of an automotive vehicle through an upwardly directed aperture either in the engine block itself, or in a valve and tappet cover over the engine block. Motor oil is most frequently supplied commercially in quart cans. For many years reuseable spouts have been provided to perforate these quart cans inwardly of the lip of the upper edge, and to hold the can in position as oil is poured into the crankcase. Spouts of this type include a piercing blade located adjacent to an arcuately curved tube and within the lateral confines of a bonnet and a brace. The spout is shoved downward upon the can at its edge with the blade piercing the lid and with the brace passing downward adjacent the side of the can. The can with the spout impaled thereon is inverted and the spout is positioned in the oil filling aperture in the engine. The bonnet confines oil flow to the spout and prevents oil from spilling from the punctured can along the sides of the spout.

In a more advanced oil dispensing device, a funnel shaped device with an elongated lip along one edge is provided. Partway down the lip an upwardly directed piercing blade is fastened. At the extreme upper extremity of the lip a trigger mechanism is arranged to press on the bottom of a quart oil can positioned at the lip to force it downwardly where it is impaled upon the piercing blade. Oil is then free to pass around the blade and flow down the funnel into an oil filling aperture for the engine.

All of the foregoing prior art oil dispensing devices are constructed with an inflexible geometry, however. With the multiplicity of different oil filling aperture locations in different model cars, and with the increasing congestion in the engine area resulting from the increased use of automotive air conditioners, pollution control devices, electronic ignition systems, and other apparatus, the use of conventional oil dispensing devices has become increasingly difficult. That is, conventional devices can be maneuvered into position to pour oil into a filling aperture only with awkward manipulation and a considerable likelihood of oil spills. Furthermore, the commercially available rigid one piece funnel and guide system with the trigger actuator is entirely too bulky to utilize with some automotive vehicles. This is particularly true where the oil filling aperture is located to the rear of the engine block, in which case positioning of the conventional trigger actuated device is obstructed by the slope of the underside of the vehicle hood. For the same reason, it is difficult and sometimes impossible to position the conventional trigger actuated devices at filling apertures which are located along the sides of the engine block, rather than at the top. Moreover, the shipment of conventional trigger actuated oil dispensing devices is inefficient, since the packages required in association with those devices are quite large and space consuming. The number of those devices which can be shipped in any larger container is severely limited because of the bulk of the individual units.

SUMMARY OF THE INVENTION

The present invention is an oil dispensing device for automotive vehicles which includes a funnel that has a wide mouth draining into a narrow spout, and a cradle for receiving an oil can and rotatably mounted within the funnel and having a trigger actuating mechanism to depress an oil can downwardly onto an upwardly directed piercing blade. Because the cradle is rotatable relative to the funnel, the unit is much more readily adaptable for use with a variety of different automotive vehicles is contrasted with prior art devices. Since the cradle can be rotated relative to the funnel, the unit can be easily manipulated into position by rotating the component parts of the device relative to each other as required. The oil dispensing device of the invention can therefore be utilized even in very restricted spaces beneath the hood of an automotive vehicle, and can be maneuvered through hoses and wires that pass over the oil filling apertures.

A further advantageous feature of the invention is that with the releasable interconnection of the oil can cradle and funnel, the two component portions of the device can be separated for shipment. This reduces the volume of the package required for shipment considerably, so that a great many more of the units can be enclosed within a shipping box. Likewise, the units can be stored in a compact fashion for retail size. Once purchased and ready for use, the funnel and cradle are merely snapped together and the device can be utilized at once.

A further advantage of the preferred construction is that the funnel and cradle can be easily cleaned while separated from each other. The snap lock swivels employed, once disengaged, can be easily wiped with a soft cloth or paper towel to remove dirt and grease that inevitably collects upon tools that are used in the engine area of an automotive vehicle.

The invention may be described with greater clarity clarity and particularly by reference to the accompanying drawings.

DESCRIPTION OF THE DRAWINGS

FIG. 1 is a sectional elevational view of a preferred embodiment of the invention.

FIG. 2 is a plan view of the device of FIG. 1.

FIG. 3 is a sectional detail taken along the lines 3—3 of FIG. 2.

FIG. 4 is a perspective view showing the oil dispensing device of the invention in use.

DESCRIPTION OF THE EMBODIMENT

The present invention is an oil dispensing device 10 formed of a funnel 12 to which a cradle 24 with a trigger actuating mechanism 26 at its upper extremity is rotatably hinged by means of oppositively disposed trunions 28, depicted in detail in FIG. 3. An upwardly directed puncturing spear-like blade 38 is provided at the lower extremity of the cradle 24.

The funnel 12 is formed of plastic and has a concave generally semispherical bowl 14 with an aperture at the bottom that drains into a narrow converging spout 16 with an oil outlet opening 18 at its lower extremity. The bowl 14 includes a pair of oppositively spaced upstanding ears 20 along its upper circular edge 22. From the ears 20, stub axles 30 extend radially inwardly, as depicted in FIG. 3, toward the center of the mouth of the semispherical bowl 14.

The cradle 24 is also formed of plastic and includes an elongated trough-like, concave chute 32 that has a pair of upwardly and outwardly flared wings 34 with radially inwardly defined wells 36 therein, adapted to receive the stub axles 30 to form the snap-lock trunions 28, depicted in FIG. 3. Since both the cradle 24 and funnel 12 are formed of plastic, either the upstanding wings 34 of the cradle 24 or the ears 20 of the funnel 12 or both, can be deflected sufficiently to allow the stub axles 30 to be inserted into or removed from the wells 36, so that the cradle 24 is releasably and pivotally attached to the funnel 12.

At the lower extremity of the chute 32 there is a concave, arcuately shaped piercing blade 38 that has a sharp spear edge or point 40 extending upwardly and spaced a short distance outward from the chute 32. The blade 38 is fastened to an offset ledge 41 at the lower extremity of the chute 32 by means of rivets 42. The gap between the edge 40 of the blade 38 and the surface of the chute 32 therebeneath, as defined by the offset of the ledge 41, is sufficient to allow the lip of an oil can to pass therebetween.

At the upper extremity of the chute 32 there is a trigger actuator 26. The trigger actuator 26 is formed with a U-shaped plastic stock 44 that includes a pair of flanges 46 connected across the back by a rearward abutment panel 48. The flanges 46 extend forwardly from the abutment panel 48 to face each other. An integrally formed positioning post 50 extends from one flange 46 toward the other. An oblong, plastic trigger lever 54 is rotatably mounted relative to the positioning post 50 by a transverse sleeve 52 arranged co-axially about the positioning post 50 of the stock 44. The encircling sleeve 52 is intregrally formed with the trigger lever 54. The trigger lever 54 is likewise of U-shaped cross section and rotates about the positioning post 50 within the lateral confines of the flanges 46 of the stock 44. The trigger lever 54 includes cross braces 56, interiorally disposed and transversely oriented relative to the length of the trigger lever 54. The upper end the trigger lever 54 terminates in a cap 60 that has a forwardly directed contact finger 62 that is used to drive an oil can down the chute 32 to impale it upon the edge 40 of the piercing blade 38. The stock 44 and trigger lever 54 are biased apart in the trigger mechanism 26 by means of a wire torsion spring 66, having opposing legs 68 and 70 that are joined in a loop about the sleeve 52. The torsion spring 66 acts upon the facing surfaces of the stock 44 and trigger lever 54 and biases the lower part of the trigger lever 54 forward and the contact finger 62 rearward, as depicted in FIG. 1. The user of the dispenser 10 positions the palm of his hand across the rear surface of the abutment panel 48 of the stock 44 and squeezes the trigger lever 54 rearward with the finger of the same hand against the bias of the torsion spring 66 to force the contact finger 62 at the cap 60 forward.

A centrally directed triangular shaped abutment 72 extends upward from the concave intersurface of the bowl 14 of the funnel 12, and coacts with a tooth 74 extending downwardly from the ledge 41 of the cradle 24 to limit the degree of upward motion of the cradle 24 to the position indicated in phantom lines at 24' in FIG. 1. When rotated to this position, the tooth 74 strikes the stop 72 of the bowl 14 of the funnel 12 to prevent the lower extremity of the chute 32 from passing upward and outward beyond the edge 22 of the mouth of the funnel 12. This prevents a gap from forming between the lower extremity of the chute 32 and the edge 22 of the funnel 12 so that oil cannot spill therebetween.

In the operation of the invention, the cradle 24 and the funnel 12 are shipped separately within the same container, but are not connected during storage and shipment. This minimizes the volume of space require for packaging and for storage and display. Once unpackaged, the cradle 24 and funnel 12 are journalled together. This is accomplished by depressing the wings 34 of the cradle 24 inwardly toward each other slightly to allow the stub axles 30 to clear the outer surfaces of the wings 34 and to permit alignment with the wells 36. Once alignment is achieved, the wings 34 are released and the stub axles 30 become rotatably seated in the wells 36. Alternatively, the ears 20 of the funnel 12 can be deflected radially outwardly to withdraw the stub axles 30 to achieve the same alignment. In either event, the cradle 24 and funnel 12 are formed of resiliently flexible plastic to allow the funnel 12 and cradle 24 to be selectively released and interengaged in this fashion.

Once the cradle 24 has been releasably and rotatably journalled to the funnel 12, the device is ready for use as depicted in FIG. 4. A can 78 filled with oil, is positioned in the cradle 24. The spout 16 of the funnel 12 is maneuvered into position directly above the filling aperture of an automotive engine block. The cradle 24 is swivelled about the trunions 28 as required so that the spout 16 of the funnel 12 can be manipulated into position in the oil filling aperture. Once the opening 18 of the spout 16 is directly over or in the oil filling aperture, an individual utilizing the device positions a hand about the stock 44 with the back panel 48 thereof residing in contact with the palm of the hand. The fingers of the same hand are wrapped around the trigger lever 54, and force is exerted to pull the trigger lever 54 rearward against the bias of the spring 66. This rotates the trigger lever 54 about the positioning post 50 to drive the contact finger 62 forward against the bottom 80 of the oil can 78 depicted in FIG. 4. Pressure upon the bottom 80 drives the oil can 78 downward along the incline of the chute 32 with the lip at the top of the oil can passing into the gap between the concave surface of the chute 32 and the edge 40 of the piercing blade 38. The edge 40 punctures the top of the oil can 78 so that oil may flow therefrom down the chute 32 and into the funnel 12, welling up into the bowl 14, but draining through the spout 16 into the engine crank case.

As previously noted, the cradle 24 can be pivoted about the trunions 28 in order to maneuver the dispenser 10 into position, and also to aid in the downward flow of the last bit of oil from the can 78 into the bowl 14. The upward rotational movement of the cradle 24 is limited as indicated at 24' in FIG. 1 by the interaction of the tooth 74 of the cradle 24 and the limit stop 72 on the interior surface of the bowl 14. This prevents the cradle 24 from being rotated too far relative to the bowl 14 so that oil does not spill between the lowermost extremity of the chute 32 and the edge 22 of the bowl 14 of the funnel 12.

It is to be understood that undoubtedly other variations and modifications of the invention will become readily apparent beyond those depicted in association with the preferred embodiment of the invention. Accordingly, the scope of the invention should not be considered as limited to the specific implementation depicted in the drawings, but rather is defined in the claims appended hereto.

I claim:

1. An oil dispensing device for an internal combustion engine comprising:
    a cradle formed with a chute that has an upwardly directly piercing blade at a lower end and a trigger mechanism at an upper end for forcing an oil can down said chute and onto said piercing blade,
    a funnel having a concave bowl with a wide mouth located above a narrow spout, and said bowl drains into said narrow spout, and said chute is provided with a tooth at its lower extremity directed toward said bowl, and
    said funnel and said cradle are equipped with releasable interacting rotating means to rotatably mount said cradle to said funnel with said lower end of said chute within said funnel, and
    said bowl of said funnel includes an outwardly directed stop on its concave wall to limit upward rotation of said chute relative to said funnel.

2. An oil dispensing mechanism, according to claim 1 further characterized in that said releasable interacting rotating means are comprised of a pair of trunions disposed opposite each other on either side of said cradle and said funnel at said funnel mouth.

3. An oil dispensing mechanism according to claim 1 further characterized in that said cradle and said funnel are equipped with journals on either side which include stub axles that releasably snap into mating bearings to form said releasable interacting rotating means.

4. An adjustable oil dispenser comprising a funnel having a concave bowl with an upwardly opening wide mouth that drains into a downwardly opening narrow spout and a tiltable cradle journaled to said funnel at said mouth for relative rotation therewith, said cradle having a chute with an upwardly directed puncturing spear located at its lower end and spaced outwardly therefrom, said lower end of said chute residing within said funnel and having a tooth at its lower extremity directed toward said bowl, and said chute includes a trigger actuated loading mechanism at its upper end for driving an oil can onto said spear, and
    said bowl includes an outwardly directed stop on its concave wall to limit upward rotation of said chute relative to said funnel.

* * * * *

Disclaimer 4,241,851.—*Howard Ibaraki*, Monterey Park, Calif. ADJUSTABLE OIL FUNNEL. Patent dated Dec. 30, 1980. Disclaimer filed Mar. 29, 1989, by the assignee, Mr. Gasket Co.

Hereby enters this disclaimer to the entire term of said patent.
[*Official Gazette May 23, 1989* ]